United States Patent
Todd et al.

(10) Patent No.: US 10,365,974 B2
(45) Date of Patent: Jul. 30, 2019

(54) ACQUISITION OF OBJECT NAMES FOR PORTION INDEX OBJECTS

(71) Applicant: HEWLETT PACKARD ENTERPRISE DEVELOPMENT LP, Houston, TX (US)

(72) Inventors: Andrew Todd, Bristol (GB); Richard Phillip Mayo, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 80 days.

(21) Appl. No.: 15/267,899

(22) Filed: Sep. 16, 2016

(65) Prior Publication Data

US 2018/0081561 A1 Mar. 22, 2018

(51) Int. Cl.
| | | |
|---|---|---|
| G06F 11/14 | (2006.01) | |
| G06F 12/08 | (2016.01) | |
| G06F 12/0808 | (2016.01) | |
| G06F 12/0815 | (2016.01) | |

(52) U.S. Cl.
CPC .... *G06F 11/1453* (2013.01); *G06F 2201/815* (2013.01); *G06F 2201/83* (2013.01)

(58) Field of Classification Search
CPC ..... G06F 3/0608; G06F 3/0619; G06F 3/0638
USPC ....................................................... 711/162
See application file for complete search history.

(56) References Cited

U.S. PATENT DOCUMENTS

| | | |
|---|---|---|
| 5,347,653 A | 9/1994 | Flynn et al. |
| 7,107,298 B2 | 9/2006 | Prahlad et al. |
| 8,442,952 B1 | 5/2013 | Amangau et al. |
| 8,458,144 B2 | 6/2013 | Maydew et al. |
| 8,533,231 B2 | 9/2013 | Aizman et al. |
| 8,635,184 B2 | 1/2014 | Hsu et al. |
| 8,650,159 B1 | 2/2014 | Zhang et al. |
| 8,694,469 B2 | 4/2014 | Parab |
| 8,745,095 B2 | 6/2014 | Bestler et al. |
| 8,918,372 B1 | 12/2014 | Guo et al. |
| 9,015,181 B2 | 4/2015 | Kottomtharayil et al. |
| 9,110,964 B1 | 8/2015 | Shilane et al. |
| 9,128,626 B2 | 9/2015 | Chacko |
| 9,235,475 B1 | 1/2016 | Shilane et al. |
| 9,251,161 B2 | 2/2016 | Rao et al. |
| 9,317,377 B1 | 4/2016 | Wu et al. |
| 2006/0036658 A1 | 2/2006 | Henrickson |
| 2008/0243958 A1 | 10/2008 | Prahlad et al. |

(Continued)

OTHER PUBLICATIONS

Dr. M. Elkstein, "Learn REST: A Tutorial," Parts 1-4, Jun. 17, 2016, <https://web.archive.org/web/20160617041539/http://rest.elkstein.org/>.

(Continued)

*Primary Examiner* — Mohamed M Gebril
(74) *Attorney, Agent, or Firm* — Hewlett Packard Enterprise Patent Department

(57) ABSTRACT

Examples include the acquisition of objects names for portion index objects. Some examples include acquisition, from a remote object storage system, of a list of object names for a plurality of portion index objects, stored in the remote object storage system. In some examples, for each of the portion index objects, the acquired object name includes an identifier of an associated deduplicated backup item and information identifying a data range of the associated deduplicated backup item that is represented by metadata of the portion index object.

11 Claims, 4 Drawing Sheets

(56) References Cited

U.S. PATENT DOCUMENTS

| | | | |
|---|---|---|---|
| 2010/0332401 A1* | 12/2010 | Prahlad | G06F 16/1844 705/80 |
| 2010/0332456 A1 | 12/2010 | Prahlad et al. | |
| 2011/0106768 A1 | 5/2011 | Khanzode et al. | |
| 2011/0161291 A1 | 6/2011 | Taleck et al. | |
| 2011/0161723 A1 | 6/2011 | Taleck et al. | |
| 2012/0084261 A1 | 4/2012 | Parab | |
| 2012/0109907 A1 | 5/2012 | Mandagere et al. | |
| 2012/0166403 A1 | 6/2012 | Kim et al. | |
| 2012/0233228 A1 | 9/2012 | Barton et al. | |
| 2014/0189432 A1 | 7/2014 | Gokhale et al. | |
| 2014/0324793 A1 | 10/2014 | Glazemakers | |
| 2014/0358858 A1 | 12/2014 | Camble et al. | |
| 2015/0199367 A1* | 7/2015 | Hammer | G06F 16/125 707/654 |
| 2015/0227543 A1 | 8/2015 | Venkatesh et al. | |
| 2016/0170657 A1 | 6/2016 | Suehr et al. | |

OTHER PUBLICATIONS

Garry Kranz, "Tintri Cloud Connector writes VM backups to AWS, IBM," Aug. 17, 2017, SearchCloudStorage.com.
Roy Thomas Fielding, "Representational State Transfer (REST)," Fielding Dissertation, Ch. 5, 2000, <https://www.ics.uci.edu/~fielding/pubs/dissertation/rest_arch_style.htm>, 16 pages.
Wikipeda, "Representational state transfer," Jul. 21, 2016, <https://en.wikipedia.org/w/index.php?title=Representational_state_transfer&oldid=730811774>.
Yan, F. et al., "A Method of Object-based De-duplication," (Research Paper), Dec. 2011, https://pdfs.sernanticscholar.org/4c1e/88b57f4b899a637a5844fa813efb12d2b17e.pdf (8 pages).
Amazon Web Services, Inc., "Working with Folders," Sep. 1, 2016, <http://docs.aws.amazon.com/AmazonS3/latest/UG/FolderOperations.html>.
Amazon Web Services, Inc., "Amazon EBS Product Details," Aug. 16, 2016, <https://aws.amazon.com/ebs/details/>.
BridgeSTOR, LLC, "Cloud Storage File System (CSFS™)," Aug. 16, 2016, <http://www.bridgestor.com/English/Technology/Cloud_Storage_File_System.html>.
Commvault Systems(R) Inc., "Cloud Storage—Overview," Sep. 6, 2016, <https://documentation.commvault.com/commvault/v10/article?p=features/cloud_storage/cloud_storage_overview.htm>.
Commvault Systems(R) Inc., "Deduplication Database Backup and Recovery," Aug. 18, 2016, <https://documentation.commvault.com/commvault/v10/article?p=features/deduplication/c_ddb_backup_and_recovery.htm>.
Commvault Systems(R) Inc., "Deduplication Overview," Aug. 18, 2016, <https://documentation.commvault.com/commvault/v10/article?p=features/deduplication/c_decluplication_overview.htm>.
Commvault Systems(R) Inc., "Simpana Software Capabilities," Aug. 18, 2016, <https://documentation.commvault.com/commvault/v10/articie?p=whats_new/c_commcell_features.htm>.
Commvault Systems(R) Inc., "Simpana Software Overview," Aug. 18, 2016, <https://documentation.commvault.com/commvault/v10/article?p=whats_new/c_main_overview.htm>.
EMC Corporation, "EMC Data Protection Solutions for Public Cloud Environments," Dec. 2015, <http://www.emc.com/collateral/white-papers/h14643-emc-data-protection-solutions-public-cloud-wp.pdf>.
EMC Corporation, "Long Term Retention to Cloud," May 2016, EMC World 2016, <http://www.emc.com/en-us/microsites/virtual/world/index.htm>.
Google, "Bucket and Object Naming Guidelines," Aug. 19, 2016, <https://cloud.google.com/storage/docs/naming>.
Google, "Key Terms," Aug. 19, 2016, Google Cloud Platform, Cloud Storage, Documentation, <https://cloud.google.com/storage/docs/key-terms>.
Hewlett Packard Enterprise Development LP., "QuickSpecs," HPE StoreOnce Systems, May 27, 2016, <http://www8.hp.com/h20195/v2/GetPDF.aspx/c04328820.pdf>.
Michael Ratner, "Better Object Storage Wth Hitachi Content Platform," Nov. 2014, <https://www.hds.com/en-us/pdf/white-paper/hitachi-white-paper-introduction-to-object-storage-and-hcp.pdf>.
Rubrik, Inc., "Rubrik Converged Data Management | Technology Overview & How It Works," 2015, <http://www.rubrik.com/content/uploads/2015/05/Rubrik-Converged-Data-Management-Tech-Overview-and-How-it-Works-White-Paper.pdf>.
ScriptingGuy1 et al., "How Can I Get a List of All the Files in a Polder and Its Subfolders?," Oct. 20, 2004, Hey, Scripting Guy! Blog, <https://blogs.technet.microsoft.com/heyscriptingguy/2004/10/20/how-can-i-get-a-list-of-all-the-files-in-a-folder-and-its-subfolders/>.
Fu et al., "Application-aware local-global source deduplication for cloud backup services of personal storage," 2014, IEEE Transactions on Parallel and Distributed Systems 25.5 (2014), pp. 1155-1165, <https://www.researchgate.net/publication/261567175_Application-Aware_Local-Global_Source_Deduplication_for_Cloud_Backup_Services_of_Personal_Storage>.
Amazon Web Services, Inc., "Get Bucket (List Objects) Version 2," Jul. 12, 2016, AWS Documentation, Amazon Simple Storage Service (S3), <https://web.archive.org/web/20160712175256/https://docs.aws.amazon.com/AmazonS3/latest/API/v2-RESTBucketGET.html>.
Amazon Web Services, Inc., "Listing Keys Hierarchically Using a Prefix and Delimiter," May 1, 2016, AWS Documentation, Amazon Simple Storage Service (S3), <https://web.archive.org/web/20160501072739/https://docs.aws.amazon.com/AmazonS3/latest/dev/ListingKeysHierarchy.html>.
Amazon Web Services, Inc., "Listing Object Keys," May 1, 2016, AWS Documentation, Amazon Simple Storage Service (S3), <https://web.archive.org/web/20160501073231/https://docs.aws.amazon.com/AmazonS3/latest/dev/ListingKeysUsingAPIs.html>.
RestApiTutorial.com, "Using HTTP Methods for RESTful Services," Apr. 14, 2016, <https://web.archive.org/web/20160414112534/https://www.restapitutorial.com/lessons/httpmethods.html>.
RESTfulAPI.net, "HTTP Methods," Jun. 8, 2016, RESTful API Tutorial, <https//web.archive.org/web/20160608220652/https://restfulapi.net/http-methods/>.
Srikanth Venkata Seshu, "5 advantages HP StoreOnce Backup brings to cloud service providers," Sep. 21, 2014, <https://community.hpe.com/t5/Around-the-Storage-Block/5-advantages-HP-StoreOnce-Backup-brings-to-cloud-service/ba-p/6794333#.W1HrqNJKiUk>.

* cited by examiner

ACQUISITION OF OBJECT NAMES FOR PORTION INDEX OBJECTS

BACKGROUND

A computer system may store data in local storage of the computer system. In some examples, the data may also be stored in a remote data backup system that is in communication with the computer system. In such examples, the data may be retrieved from the data backup system when the data is lost, corrupted, or otherwise becomes inaccessible at the local storage of the computer system, for example.

BRIEF DESCRIPTION OF THE DRAWINGS

The following detailed description references the drawings, wherein.

DETAILED DESCRIPTION

Figure 1:
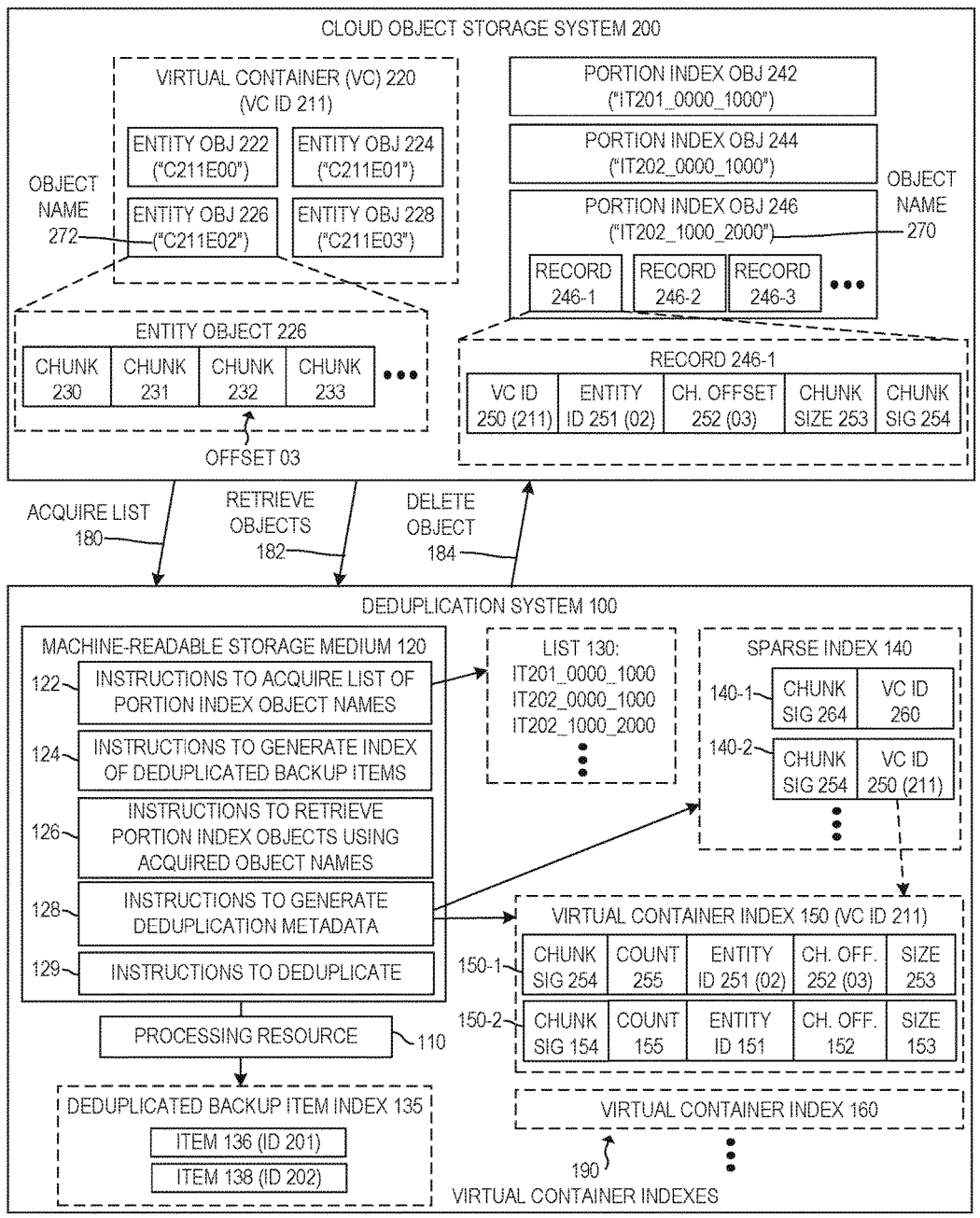
FIG. 1 is a block diagram of an example computing environment including a deduplication system to generate deduplication metadata including a sparse index and virtual container indexes.

As described above, data stored in local storage of a computer system may also be stored in a remote data backup system that is in communication with the computer system. In some examples, the data backup system may deduplicate data provided for backup in order to store the data using less space than would be occupied by the full data (i.e., in non-deduplicated form). In examples described herein, a process of deduplication performed by a data backup system (or other system) on a collection of data (referred to herein as a "stream" of data) may include breaking the stream into portions of data referred to herein as "chunks", identifying chunk(s) of the stream that have content identical to the content of another chunk of the stream (or previous streams), storing one (full or compressed) copy of that identical content, and storing references to that one copy of the identical content for chunk(s) of the data stream that include that content. In this manner, a deduplication process may avoid storing "duplicate" copies of chunks of a stream of data, and instead store a single copy of data content that is identified as having duplicates in the stream of data. In such examples, the system performing the deduplication may store metadata including, for each chunk in the data stream, a reference to the stored copy of the content the chunk. Such metadata may enable reconstruction of the original, full version of the stream of data by the system by traversing the metadata and, for each reference to a stored copy of data, providing the full content of data that the reference points to.

For disaster recovery purposes, it may be desirable to store data and metadata embodying a deduplicated stream of data at a storage location that is remote from deduplication system (e.g., backup system) that performed the deduplication, so that the deduplicated stream may be restored from the remote storage. Examples described herein may structure and store deduplicated data and metadata in a remote object storage system (such as a cloud object storage system) such that deduplicated streams of data, or portions thereof, may be restored from the remote object storage system by a local deduplication system efficiently after a data loss at the local deduplication system.

Additionally, to efficiently perform deduplication, a deduplication system may create and utilize various types of deduplication metadata for determining whether a given chunk of data has been seen previously in a data stream to be backed up, and thus may be considered a duplicate chunk whose content can be omitted from being stored again. In such examples, this deduplication metadata may be continually updated while processing a data stream, including adding new metadata or mappings for chunks of data and adjusting reference counts for chunks of data, for example.

It may also be desirable to recover this the deduplication metadata in a disaster recovery situation (e.g., after a data loss, when another deduplication system is to be used after a failure of another). However, it may be difficult to store this deduplication metadata in an object storage system, as the ability to update data stored as objects in an object storage system (such as a cloud object storage system) may be limited, as some cloud object storage system(s) do not enable editing a data object once stored. For example, an object storage system (e.g., a cloud object storage system) may be implemented such that an object is "immutable" once it is stored, in that the object storage system does not enable editing, appending to, or truncating a stored object. In such examples, object stored in the object storage system may be considered "immutable". In such examples, it may be difficult to perform the continual updating of the deduplication metadata if it were stored in such an object storage system (e.g., such a cloud object storage system).

To address these issues, examples described herein may utilize deduplication metadata stored on a local system to perform deduplication, and store backup data and backup metadata in cloud object storage in such a manner that the local deduplication metadata and the original data stream may be relatively efficiently reconstructed and restored from the data stored in the cloud object storage in case of a loss of the local-side deduplication metadata. For example, the backup data and backup metadata may be stored as objects with self-describing object names that enable efficient reconstruction of the deduplication metadata and efficient restore of a stream of data without using previously created local data (e.g., after a loss of the local-side data).

For example, after a loss of a local deduplication system, or loss of data at a local deduplication system, the same deduplication system or another deduplication system may acquire, from a remote object storage system, a list of object names for a plurality of portion index objects, stored in the remote object storage system, wherein, for each of the portion index objects, the acquired object name includes an identifier of an associated deduplicated backup item and information identifying a data range of the associated deduplicated backup item that is represented by metadata of the portion index object. In such examples, the system may generate an index of deduplicated backup items including a respective entry for each different deduplicated backup item identifier in the acquired list of object names. In such examples, the deduplication system may efficiently restore a deduplicated backup item index based on retrieval of object names from the remote object storage system.

In some examples, the system may further retrieve the plurality of portion index objects from the remote object storage system using the acquired object names, and generate deduplication metadata including: a plurality of virtual container indexes populated with metadata from the retrieved portion index objects, and a sparse index populated based on a chronological traversal of records in the retrieved portion index objects. In such examples, the deduplication system may efficiently restore the deduplication metadata including the sparse index and the container indexes based on portion indexes retrieved from the remote object storage system and without storing the sparse index or container indexes on the remote object storage system.

Referring now to the drawings, FIG. 1 is a block diagram of an example computing environment including a deduplication system 100 to generate deduplication metadata including a sparse index 140 and virtual container indexes 190. The computing environment also includes a remote object storage system, which is implemented by a cloud object storage system 200 in the example of FIG. 1.

In examples described herein, an object storage system is a system that stores data in the form of objects having object names and that does not enable arbitrary editing of stored objects. For example, an object storage system may not enable editing of any data stored in an object. In some examples, the object storage system may enable appending new data to a stored object. In other examples, the object storage system may not enable appending new data to an object. In some examples, an object storage system may not enable truncating a stored object. In some examples, the object storage system may store data as immutable objects and not enable editing data of a stored object, appending to a stored object, or truncating a stored object.

In some examples, the object storage system may be a remote object storage system in that the object storage system is "remote" from a deduplication system that stores objects in the object storage system. In examples described herein, a remote object storage system may not be local to (or locally attached to) the deduplication system, but may instead be accessible to the deduplication via a computer network such as, for example, a local area network (LAN), a virtual LAN (ULAN), a wireless local area network (WLAN), a virtual private network (VPN), the Internet, or the like, or a combination thereof. In some examples, the remote object storage system may be a "cloud" object storage system that is remote from the deduplication system (and may be referred to herein as a "remote cloud object storage system"). In examples described herein, a remote object storage system (e.g., cloud object storage system) may be implemented by at least one computing device.

In the example of FIG. 1, deduplication system 100 may be implemented by at least one computing device (e.g., including a physical network interface for communication on a computer network). Deduplication system 100 may include at least one processing resource 110, and at least one machine-readable storage medium 120 comprising (e.g., encoded with) instructions (including instructions 122, 124, 126, and 128) that are executable by the at least one processing resource 110 of deduplication system 100 to implement functionalities described herein in relation to FIG. 1. In examples described herein, a process of data deduplication (or "deduplication" herein) may involve splitting a collection of data (referred to as a "stream" herein) into "chunks" of identifying duplicate chunks of backup data, storing one copy of identified duplicate chunk of data, and maintaining metadata that enables reconstruction of the original, full version of the backup data from the stored deduplicated data. Such metadata may include, for each duplicate chunk of data that is identified, a reference to a stored portion of the data, for example.

The example of FIG. 1 illustrates a deduplication system 100 to recover deduplication metadata, including a sparse index 140 and virtual container indexes 190, from data stored in cloud object storage system 200. For clarity in late explanation of the process of recovering deduplication metadata (including the sparse index and the virtual container indexes), aspects of the structure and use of sparse index 140, virtual container indexes 190, and data in remote object storage system 200 (e.g., cloud object storage system 200) will first be described below, in accordance with some examples. For purposes of explanation, it will be assumed that sparse index 140, virtual container indexes 190 (including, e.g., virtual container indexes 150, 160, etc.), and deduplicated backup item index 135 (or "backup item index" 135) are currently present in storage of deduplication system 100, such as at least one machine-readable storage medium.

In some examples, storage medium 120 may include instructions 129 (in addition to instructions 122, 124, 126, and 128). In such examples, instructions 129 may begin receiving a stream of data to deduplicate and store in remote object storage system 200. A stream or a portion of the stream may be associated with one or more backup items that are deduplicated by deduplication system 100. In the example of FIG. 1, deduplication system 100 may maintain an index 135 of deduplicated backup items including, for example, a backup item entry 136 that may correspond to a particular collection or stream of data on which deduplication system 100 has performed, will perform, or is in the process of performing deduplication. In the example of FIG. 1, index 135 also includes a backup item entry 138, and may include additional, fewer, or other backup items entries. In examples, backup item entries represent different collections or streams of data that may be restored by deduplication system 100 in whole or in part. In the example of FIG. 1, backup item entry 136 includes a backup item ID "201" that identifies a deduplicated backup item, and backup item entry 183 includes a backup item ID "202" that identifies another deduplicated backup item.

In the example of FIG. 1, deduplication system 100 may begin to acquire a stream of data associated with a particular backup item, such as backup item associated with backup item ID "202", for example. Instructions 129 may begin a deduplication process on the stream once a section of the stream of a threshold size has been buffered at deduplication system 100, such as a 20 MB section of the stream (or any other suitable amount of the stream). Instructions 129 may then split that section of the stream into respective chunks of a fixed side (e.g., approximately 4K) or a variable size, and then obtain a chunk signature for each chunk by applying an appropriate signature function to the content of the chunk to obtain a chunk signature as a result. In some examples, the signature function may be a hash function, and the chunk signature may be a hash of the chunk generated by applying the hash function on the chunk. Any suitable hash function may be used to generate the chunk signature. In other examples, any other suitable type of signature function may be used in place of a hash function to generate an appropriate chunk signature (e.g., a function to generate a suitable type of fingerprint).

Using the chunks and chunk signatures, instructions 129 may further determine whether the content of any of the chunks have been backed up previously for a given deduplication domain (i.e., a given growing set of data against which deduplication is performed). In examples described herein, this process may be referred to as a process of determining whether a given chunk is a "match" to a chunk already stored in the given deduplication domain. In examples described herein, instructions 129 may utilize sparse index 140 and virtual container indexes 190 to relatively efficiently determine whether or not each given chunk matches a previously stored chunk. Prior to providing a description of the matching process itself, the manner in which data and metadata are stored in a remote object storage system is first described below for context.

In the example of FIG. 1, for each chunk in the stream, instructions 129 may determine whether a chunk is found to be a match to a chunk already encountered or backed up in the given deduplication domain (as described below). In the example of FIG. 1, if instructions 129 do not find a chunk to be a match to a previously encountered chunk, then instructions 129 may buffer that chunk for upload to the remote object storage system 200, and buffer a record of metadata representing the chunk to be included in a portion index object that will represent the data range of the stream that includes the chunk. If instructions 129 do find the chunk to be a match to a previously encountered chunk, then instructions 129 will not buffer the chunk for upload (as a duplicate chunk has already been stored or buffered), but will instead buffer a record of metadata representing the chunk for inclusion in the portion index object to represent the data range, where the metadata references in the record references the duplicate chunk (that has already been stored or buffered).

The storage of chunks and portion index objects in the remote object storage system 200 will now be described in more detail below. In the example of FIG. 1, for each chunk of the stream that is not found to be a match, instructions 129 may buffer the chunk for storage in remote object storage system 200. When the group of buffered chunks reaches a certain size (e.g., approximately 128K, or any other suitable size), instructions 129 may store the group of buffered chunks in remote object storage system 200 as an entity object, which is an individual object of the remote object storage system 200. Referring to FIG. 1, for example, instructions 129 may buffer a group of chunks including chunks 230, 231, 232, 233, etc., and store the chunks as an entity object 226 in remote object storage system 200. Instructions 129 may store multiple entity objects in remote object storage system 200, such as entity objects 222, 224, 226, and 228, each including a different plurality of chunks. Although FIG. 1 illustrates four entity objects stored in remote object storage system 200, more or fewer entity objects may be stored in remote object storage system 200 (and the number may change over time).

In the example of FIG. 1, entity objects stored in remote object storage system 200 may also be logically grouped into virtual containers. In examples described herein, a virtual container may be a logical association of entities, which may be beneficial for efficiency of deduplication matching decisions. Each virtual container may have an assigned virtual container identifier (ID), and may be associated with a given virtual container index associated with the same virtual container ID, as described further below. For example, in the example of FIG. 1, a virtual container 220 may be a logical grouping of entity objects including at least entity objects 222, 224, 226, and 228 of remote object storage system 200. Virtual container 220 may be assigned a virtual container ID 211.

Additionally, in the example of FIG. 1, for each chunk in the stream, a record of metadata associated with the chunk may be buffered for upload as part of a portion index object. In examples described herein, a "portion index object" may be an object stored in an object storage system that includes metadata for each chunk of a particular data range of a backup item. In examples described herein, a portion index object may include metadata records in a sequential order that is the same as the sequential order of the chunks (that the records represent) within the data range of the backup item (that is represented by the portion index object). For example, a particular data range of a backup item may be split into chunks, as described above, and the portion index representing that data range may include, for each of the chunks in that data range, a record including metadata related to the chunk, with the records ordered in the same sequential order within the portion index object as the chunks they represent are ordered in the data range of the backup item. In this manner, each portion index object may serve as a manifest indicating the order in which chunks (represented by records of the portion index object) are to be reconstructed to restore the respective data range of a respective backup object.

In examples described herein, each record of each portion index object may include metadata sufficient to access (e.g., retrieve) the chunk that the respective record represents. For example, each record may include a virtual container ID and entity ID indicating a respective virtual container and an entity object that includes the chunk represented by the record (where the entity object is logically associated with the virtual container). Each record may further include, for example, a chunk offset to identify where the chunk it represents is located within the identified entity object, and a chunk size to indicate, for example, how far past the offset the chunk extends in the entity object. Each record may further include a chunk signature (e.g., a hash) of the content of the chunk (e.g., the chunk signature used for matching decisions as described herein). In the example of FIG. 1, for example, portion index object 246 may include a record 246-1 representing a chunk 232 stored in remote object storage system 200. In such examples, record 246-1 may include a virtual container ID 250 having a value of "211" and thus identify the virtual container assigned ID "211", which is the illustrated virtual container 220. Record 246-1 may further include an entity ID 251 indicating a value of "02", which indicates entity object 226, and a chunk offset 252 having a value of "03", which indicates that the chunk is located at an offset "03" (which is where chunk 232 is located within entity object 226. Record 246-1 may further include a chunk size 253, representing the size of chunk 232, and a chunk signature 254 for chunk 232. In some examples, records of portion index objects may include other information as well. For example, in some examples, chunks may be compressed for storage in entity objects and, in such examples, the records may include a compression code (indicating a compression methodology utilized) and both a compressed size of the chunk and an uncompressed size of the chunk. In examples described herein, portion index objects include metadata for represented chunks in records, as described above, and do not include actual data of the chunk itself (either compressed or uncompressed). Rather, as described herein, chunk data is stored in respective entity objects which are distinct from portion index objects, which include metadata for the data chunks stored in separate entity objects.

For portion index objects, when enough records are buffered to cover a certain size of data range (e.g., 100 MB, 1 GB, or any other suitable amount), or the end of the stream in reached, then instructions 129 may store the group of buffered records in remote object storage system 200 as a portion index object, which is an individual object of the remote object storage system 200. Referring to FIG. 1, for example, instructions 129 may buffer a group of records including records 246-1, 246-2, 246-3, etc., and store the records as a portion index object 246 in remote object storage system 200. Instructions 129 may store multiple portion index objects in remote object storage system 200, such as portion index objects 242, 244, and 246, each including records of metadata for chunks of a given data range of a given backup item. Although FIG. 1 illustrates four portion index objects stored in remote object storage system 200, more or fewer portion index objects may be stored in remote object storage system 200 (and the number may change over time). Also, although FIG. 1 illustrates three records in portion index object 246, more records may be stored in each portion index object.

In examples described herein, each object stored in a remote object storage system may be assigned an object name by which the object may be accessed in the remote object storage system. For example, in the example of FIG. 1, each of entity objects 222, 224, 226, and 228 is assigned an object name. In examples described herein, instructions 129 assign each entity object a name that is based on the virtual container ID for the virtual container it is assigned to (i.e., logically associated with) and an entity ID for the entity within the associated virtual container. For example, in the example of FIG. 1, for each entity object, instructions 129 may construct the object name to include both the virtual container ID associated with the entity object and the entity ID for the entity object. In some examples, the object name may include other information, such as an alphanumeric tag with each ID. In the example of FIG. 1, for example, instructions 129 may construct an entity object name to include a "C" (for virtual container ID) followed by the virtual container ID, and include an "E" (for entity ID) followed by the entity ID. For example, in the example of FIG. 1, entity object 222 may be assigned an entity ID "00" within virtual container 220 and may be assigned an object name of "C211E00", including the virtual container ID "211" for virtual container 220 and its entity ID "00". In like manner, entity object 224 may be assigned an entity ID "01" within virtual container 220 and may be assigned an object name of "C211E01", entity object 226 may be assigned an entity ID "02" within virtual container 220 and may be assigned an object name 272 of "C211E02", and entity object 228 may be assigned an entity ID "03" within virtual container 220 and may be assigned an object name of "C211E03". Although in the example of FIG. 1, the object names are constructed with a leading tag "C" before the virtual container ID and a leading tag "E" before the entity ID, in other examples the leading tags may be different or omitted, and other information, demarcation, or the like, may be included in the object names along with the virtual container ID and entity ID. In examples described herein, virtual containers are not objects stored in the remote object storage system 200, but are instead a logical grouping of entity object(s) that are objects of the remote object storage system 200. In such examples, virtual containers do not have any object name, though they are assigned a virtual container ID, as described above.

In examples described herein, each portion index object stored in a remote object storage system may also be assigned an object name by which the object may be accessed in the remote object storage system. For example, in the example of FIG. 1, each of portion index objects 242, 244, and 246, may be assigned an object name. In examples described herein, instructions 129 may assign each portion index object a name that is based on an associated backup item ID and a data range represented by the portion index object. For example, for each portion index object uploaded to remote object storage system 200, instructions 129 may assign the portion index object a name that includes a backup item ID of an associated backup item that is at least partially represented by metadata of the portion index object, and that includes information identifying a data range of the associated backup item that is represented by metadata of the portion index object.

For example, in the example of FIG. 1, for each entity object, instructions 129 may construct the object name to include both the backup item ID associated with the portion index object and information representing the data range of the associated backup item that the portion index object represents. In some examples, the object name may include other information, such as an alphanumeric tag associated with an ID, or the like. In the example of FIG. 1, for example, instructions 129 may construct an entity object name to include a string "IT" (for "item") followed by the backup item ID, and include a beginning and ending offsets defining a data range and separated by any suitable demarcation.

For example, in the example of FIG. 1, portion index object 246 may be assigned an object name 270 having a value of "IT202_1000_2000", which includes backup item ID "202" identifying a backup item associated with backup item ID "202", and which includes information identifying that portion index object 246 represents a data range of the backup item having ID "202" that begins at offset "1000" and ends at offset "2000" of that backup item. In such examples, the tag "IT" may identify "202" as a backup item ID, and the offsets in the name may be demarcated by underscore characters. In other examples, other suitable tags and demarcation formats may be used. Also in the example of FIG. 1, portion index object 244 may be assigned an object name of "IT202_00001000", which includes backup item ID "202" identifying the backup item, and which includes information identifying that portion index object 244 represents a data range of the backup item (having ID "202") that begins at offset "0000" and ends at offset "1000" of the backup item. Also in the example of FIG. 1, portion index object 242 may be assigned an object name of "IT201_00001000", which includes backup item ID "201" identifying backup item 201, and which includes information identifying that portion index object 242 represents a data range of a backup item having ID "201" and that begins at offset "0000" and ends at offset "1000" of the backup item. Although in the example of FIG. 1, the portion index object names are constructed with a leading tag "IT" before the backup item ID and underscore demarcations, in other examples the leading tag may be different or omitted, and other information, demarcations, or the like, may be included or used in the portion index object names along with the backup item ID and data range information. Also, in other examples, the data range may be indicated in the portion index object names in another suitable manner (e.g., indicating that the portion index object represents data 0-1 GB of data of the backup item, etc.). Although example numbers used herein for identifiers, offsets, and the like, are provided for illustrative and explanatory purposes, actual numbers used in implementations of examples described herein may be different in length, values, format, etc., while being used in manner consistent with examples described herein.

Returning now to a description of a chunk matching process that may be performed by deduplication system 100 in accordance with examples described herein, deduplication system 100 may utilize a sparse index 140 and virtual container indexes 190 in performing a chunk matching process of an overall deduplication process (i.e., when performing deduplication on a stream of data). In examples described herein, deduplication system 100 may store (in local storage of system 100) a plurality virtual container indexes 190, including a respective virtual container index for each virtual container associated with entity objects stored in remote object storage system 200. For example, the plurality of virtual container indexes 190 may include a virtual container index 150 associated with virtual container 220. In examples described herein, a virtual container index that is associated with a given virtual container of entity objects may be a virtual container index that includes metadata for each chunk of each entity object of the given virtual container. In some examples, the metadata for a chunk included in a virtual container index entry may include a chunk signature for the chunk, a reference count (indicating how many portion index object records point to the chunk), an entity ID of the entity object containing the chunk, and a chunk offset indicating where the chunk is located in the identified entity object, and a size of the chunk. As described above, in some examples, chunks may be compressed for storage in entity objects and, in such examples, a virtual container index entry may include a compression code (indicating a compression methodology utilized) and both a compressed size of the chunk and an uncompressed size of the chunk.

In the example of FIG. 1, for example, virtual container index 150, associated with virtual container 220, may include metadata for each chunk of each entity object of virtual container 220. For example, virtual container index 150 may include respective virtual container index entries 150-1, 150-2, etc., for each chunk of each of entity objects 222, 224, 226, 228, etc., associated with virtual container 220. As an example, virtual container index entry 150-1 may include metadata for chunk 232 of entity object 226 of virtual container 220, such as chunk signature 254 for chunk 232, reference count 255 for chunk 232, entity ID 251 (e.g., ID "02") indicating the entity object within virtual container 220 that includes chunk 232, chunk offset 232 (e.g., offset "03") indicating an offset within the entity object where chunk 232 is located, and a size 253 of chunk 232. Similarly, virtual container index entry 150-2 may include metadata for another particular chunk of virtual container 220, including a chunk signature 154, reference count 155, entity ID 151, chunk offset 152, and size 153, all associated with the particular chunk. Virtual container index 150 may similarly contain virtual container index entries for each chunk stored in an entity object associated with virtual container 220.

In examples described herein, a virtual container index and the virtual container it is associated with may both be identified by the same virtual container ID. For example, virtual container 220 may be assigned a virtual container ID of "211" and virtual container index 150 (associated with virtual container 220 as described above) may also be assigned (or otherwise associated with) the same virtual container ID "211", Each other virtual container index of plurality 190, such as virtual container index 160, may be associated with a respective other virtual container and include virtual container index entries representing chunks of that other virtual container, as described above for virtual container index 150.

In examples described herein, deduplication system 100 may store (in local storage of system 100) a sparse index 140 including entries mapping chunk signatures (e.g., hashes) to virtual container identifiers. In examples described herein, sparse index 140 may not contain an entry for every chunk signature encountered in the deduplication domain, but may instead contain an entry for chunk signatures (of chunks processed for a given deduplication domain) that meet a sparse signature condition. In some examples, the sparse signature condition may be a condition that is met by a relative small number of all of the possible chunk signatures. For example, the sparse signature condition may be whether a given chunk signature (in a binary representation, for example) includes a particular bit pattern at a particular offset. For example, an example sparse signature condition may be met by each chunk signature having five zeroes ("0"s) in a row starting at a given bit position (or offset) of the chunk signature (e.g., starting at the fifth bit position). In other examples, other suitable sparse signature conditions may be used. In some examples, the sparse signature condition may be selected such that the chunk signatures that meet the condition may have a desirable statistical distribution over the universe of the possible chunk signatures in the deduplication domain. In examples described herein, a given sparse signature condition may be deterministic such that the sparse signature condition would always be met by the same set of chunk signatures.

In examples described herein, each of the entries 140-1, 140-2, etc., in sparse index 140 may include a mapping of a given chunk signature (meeting a given sparse signature condition) to a virtual container ID of a virtual container index including an entry for a chunk having the given chunk signature. For example, in the example of FIG. 1, entry 140-2 of sparse index 140 may include a chunk signature 254 (meeting a given sparse signature condition for sparse index 140) and may map the chunk signature 254 to a virtual container ID 250 having a value of "211", and which thereby indicates virtual container index 150 that is assigned virtual container ID 211. In the example of FIG. 1, the virtual container index 150 (that is assigned virtual container ID 211) includes an entry 150-1 for a chunk 232 having the chunk signature 254 of the sparse hash entry 140-2. Similarly, each entry in sparse index 140 may similarly map a given chunk signature to a virtual container ID for a virtual container index of deduplication system 100. In such examples, each chunk signature of sparse index 140 may, in effect, point to one of the virtual container indexes 190.

A matching process of instructions 129 of deduplication system 100 is now described below with reference to the objects and indexes described above. In examples described herein, each of deduplicated backup item index 135, sparse index 140, and virtual container indexes 150 may be stored in storage of deduplication system 100 (e.g., at least one machine-readable storage medium of deduplication system 100).

In examples described herein, when performing deduplication of a stream of incoming data for a given backup item against a given deduplication domain, the number of chunk signatures seen and stored in the deduplication domain may be too great to compare a chunk signature for every incoming chunk against every previously seen chunk signature when searching for duplicates. As such, deduplication system 100 may utilize sparse index 140 and virtual container indexes 190 to make data-locality based decision of what collection of chunk signatures incoming chunks should be compared again.

As described above, deduplication system 100 may begin to acquire a stream of data associated with a particular backup item (e.g., a backup item associated with ID "202"), and instructions 129 may begin a deduplication process on the stream once a section of the stream of a threshold size has been buffered at deduplication system 100, such as a 20 MB section of the stream (or any other suitable amount of the stream). As described above, instructions 129 may then split that section of the stream into respective chunks of a fixed side (e.g., approximately 4K) or a variable size, and then obtain a chunk signature for each chunk by applying a given signature function to the content of the chunk to obtain a chunk signature as a result. The resulting plurality of chunk signatures for the new chunks may be referred to as "incoming" chunk signatures herein. Instructions 129 may then decide what previously stored chunk signatures to compare the incoming chunk signatures against using the sparse index 140 and container indexes 190.

For example, instructions 129 may determine which of the incoming chunk signatures meet the sparse signature condition associated with the sparse index 140, and then look up in the sparse index 140 each of the incoming chunk signatures that meets the sparse signature condition to obtain the virtual container ID mapped to the incoming chunk signature in the sparse index 140 (if the incoming signature is present in the sparse index 140). In this manner, instructions 129 may obtain a list of virtual container IDs for virtual container indexes that include entries for incoming chunk signatures that meet the sparse signature condition. In such examples, the same virtual container ID may be returned multiple times where incoming chunk signatures (meeting the sparse signature condition) map to the same virtual container ID in sparse index 140. In such examples, instructions 129 may then select at least one of the returned virtual container IDs and use the associated virtual container index(es) (i.e., "selected" virtual container index(es)) for matching comparisons. For example, instructions 129 may select one of the virtual container IDs (e.g., the one returned the greatest number of times), multiple of the virtual container IDs (e.g., some number of the virtual container IDs returned more times than others), or all of the returned virtual container IDs, in a suitable manner. In such examples, for each of the selected virtual container IDs, instructions 129 may compare all of the incoming chunk signatures against all of the entries of the virtual container index associated with the selected virtual container ID, looking for chunk signature matches. In such examples, instructions 129 may determine that there is a chunk signature match when a comparison indicates that an incoming chunk signature is identical to a chunk signature of one of the entries of a selected virtual container index. In such examples, a chunk signature match indicates that the incoming chunk has been stored previously where indicated in part by the metadata of the virtual container index entry having the matching chunk signature.

In such examples, based on a comparison of each of the incoming chunk signatures against the chunk signature of each of the selected virtual container indexes, instructions 129 may determine whether a chunk is found to be a match to a chunk already encountered or backed up in the given deduplication domain. As described above, if instructions 129 do not find an incoming chunk to be a match to a previously encountered chunk (based on signature matching as described above), then instructions 129 may buffer that chunk for upload to the remote object storage system 200, and buffer a record of metadata representing the chunk to be included in a portion index object that will represent the data range of the stream that includes the chunk, as described above. If instructions 129 do find the incoming chunk to be a match to a previously encountered chunk (based on signature matching as described above), then instructions 129 will not buffer the chunk for upload (as a duplicate chunk has already been stored or buffered), but will instead buffer a record of metadata representing the chunk for inclusion in the portion index object to represent the data range, where the metadata references in the record references the duplicate chunk (that has already been stored or buffered), and increment the reference count for the matching chunk signature in the virtual container index having the chunk signature that matches the incoming chunk signature.

In some examples, deduplication system 100 may suffer a data loss for any of a number of different reasons, such as a failure of memory or storage (e.g., memory device failure, storage device failure), or suffer an issue that is resolved by re-imaging a computing device at least partially implementing deduplication system 100. In such examples, data stored in memory or storage of deduplication system 100 may be lost, such as sparse index 140, virtual container indexes 190, and backup item index 135. In such examples, the data stored in remote object storage system 200 may survive the data loss at deduplication system 100. In such cases, the entity objects and portion index objects stored in remote object storage system 200 may remain. In examples described herein, the entity objects and portion index objects may enable deduplication system 100 to recover the lost backup item index 135, sparse index 140, and virtual container indexes 190 in an efficient manner, as described below.

In other examples, another deduplication system may have created and stored the entity objects and portion index objects in remote object storage system 200 while locally constructing and using backup item index 135, sparse index 140, and virtual container indexes 190. In such examples, if there is a failure at the other deduplication system, then, in accordance with examples described herein, deduplication system 100 (which never had backup item index 135, sparse index 140, and virtual container indexes 190) may recover backup item index 135, sparse index 140, and virtual container indexes 190 based on the entity object and portion index objects stored in remote object storage system 200, and continue to perform deduplication to the deduplication domain in the place of the other deduplication system.

Figure 2:
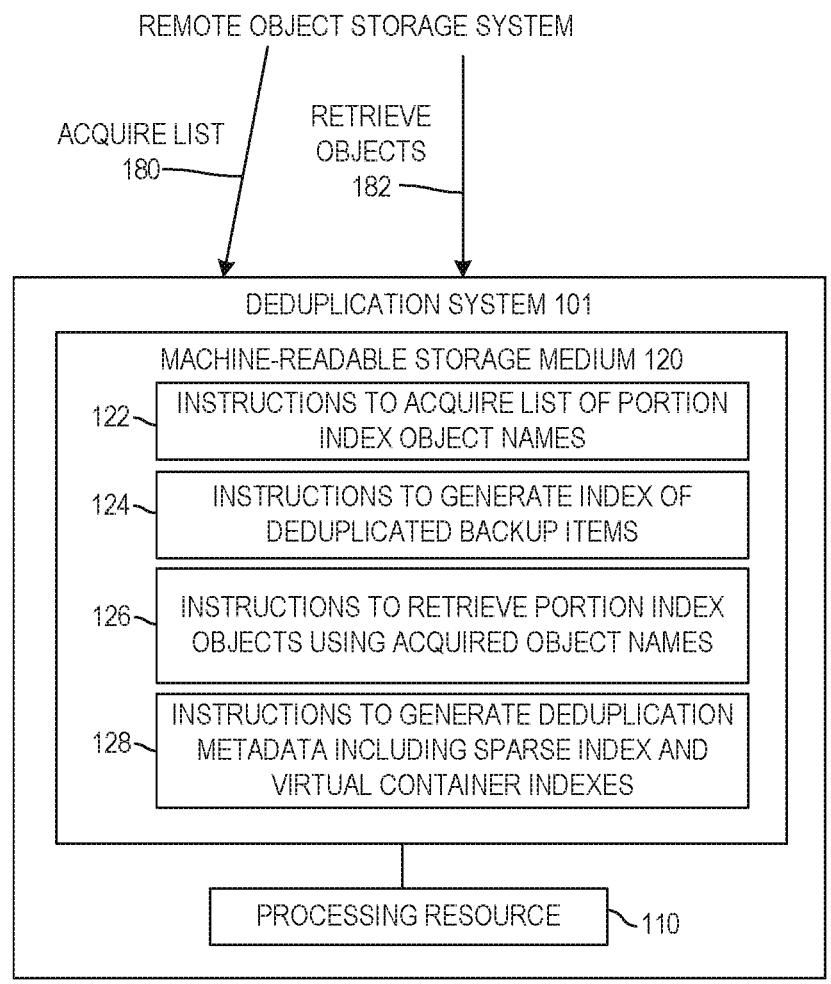
FIG. 2 is a block diagram of an example deduplication system to acquire a list of object names for a plurality of portion index objects.

Examples of the recovery of backup item index 135, sparse index 140, and virtual container indexes 190 by deduplication system 100 will now be described in relation to the examples of FIGS. 1 and 2. FIG. 2 is a block diagram of an example deduplication system to acquire a list of object names for a plurality of portion index objects. In examples described herein, deduplication system 100 may begin the recovery process in a state as illustrated for the deduplication system 101 of FIG. 2, in which none of backup item index 135, sparse index 140, and virtual container indexes 190 are stored in memory or other storage of the deduplication system (e.g., because of a data loss, because they were created and used by another system that may have failed, etc.).

Referring to FIG. 1, instructions 122 may acquire 180 (e.g., retrieve, receive, etc.), from remote object storage system 200, a list of object names 130 for a plurality of portion index objects stored in remote object storage system 200, based on the content of the object names of the portion index objects. For example, according to the above-described structure for object names for portion index objects, all portion index objects named by instructions 129 (or corresponding instructions of another system) may share a substring of their object names (i.e., share an "object name substring"). For example, the object names of the portion index objects may share the leading tag "IT" that precedes the backup item ID in each object name, in the example of FIG. 1.

In such examples, instructions 122 may create a request for remote object storage system 200 to provide a list of object names, of objects stored in remote object storage system 200, where the object name begin with a substring indicated in the request (e.g., "IT"). Instructions 122 may provide the request from deduplication system 100 to remote object storage system 200, and may receive in response a list 130 of object names of portion index objects stored in remote object storage system 200 that share the object name substring indicated in the provided request.

In the example of FIG. 1, instructions 122 may provide the request from deduplication system 100 to remote object storage system 200, and may receive in response a list 130 of object names, of portion index objects stored in remote object storage system 200, that share the object name substring "IT" indicated in the request. For example, the returned list 130 may include at least object names "IT201_0000_1000" for portion index object 242, "IT202_0000_1000" for portion index object 244, and "IT202_1000_2000" for portion index object 246 (and may include additional object names for additional portion index objects stored in system 200). In such examples, for each of the portion index objects having a name sharing the indicated substring, the acquired object name may include an identifier of an associated deduplicated backup item and information identifying a data range of the associated deduplicated backup item that is represented by metadata of the portion index object, as described above. For example, a first acquired object name in list 130, "IT201_0000_1000" may include an identifier "201" of an associated deduplicated backup item, and information "0000_1000" identifying a data range of the associated deduplicated backup item that is represented by metadata of the portion index object for which "IT201_0000_1000" is the object name.

In some examples, the request for object names provided by instructions 122 may be in the form of a request to list the object names beginning with the specified data (e.g., "IT"). In some examples, the request may be in the form of a "filter" command or request to list the object names of objects stored in remote object storage system 200 beginning with specified data (e.g., "IT"). In other examples, instructions 129 may give differently formatted object names to portion index objects (e.g., starting with "I" or "ITEM", etc.), and instructions 122 may form an appropriate request for a list of the object names of the stored portion index objects based on an object name portion shared by the object names of the portion index objects. In the example of FIG. 1, instructions 122 may acquire the list of object names for the portion index objects without downloading the portion index objects themselves, or any entity objects.

In the example of FIG. 1, instructions 124 may generate, on deduplication system 100, an index 135 of deduplicated backup items that may include a respective entry for each different deduplicated backup item identifier in the acquired list of object names. For example, instructions 124 may examine the obtained list 130 of object names and identify each different backup item ID present in the list of object names. For each different backup item ID identified in the list 130, instructions 124 may create a separate backup item entry in deduplicated backup item index 135. In the example of FIG. 1, for example, instructions 124 may identify at least backup item IDs "201" and "202", and create a first backup item entry 136 (including ID "201") and a second backup item entry (including ID "202"). In examples described herein, a backup item may include a corresponding backup item identifier (e.g., ID "201" in backup item 136). The created deduplicated backup item index 135 may be stored in storage of deduplication system 100 (e.g., at least one machine-readable storage medium of system 100).

In the example of FIG. 1, instructions 126 may retrieve the plurality of portion index objects from the remote object storage system using the acquired object names of the list 130. For example, instructions 126 may request, from remote object storage system 200, the portion index objects having the object names included in list 130 (e.g., at least portion index objects 242, 244, and 246). For example, instructions 126 may provide one or more requests to remote object storage system 200 including the object names of list 130 and requesting that the portion index objects having those names be returned to deduplication system 100. For example, instructions 126 may provide a request including object name "IT201_0000_1000" to remote object storage system 200, requesting that remote object storage system 200 return the portion index object 242 having that name. In some examples, instructions 126 may provide a separate request to system 200 to obtain each portion index object by name. In some examples, at least some of the requests may be provided concurrently. In some examples, at least some of the portion index objects may be obtained using bulk request(s) to system 200 to obtain the portion index objects by name.

In some examples, instructions 126 may retrieve the plurality of portion index objects from remote object storage system 200 chronologically, using the acquired object names and based on timestamps of the remote object storage system. In some examples, system 200 may return list 130 of object names sorted according to timestamps associated with the portion index objects associated with those object names. In such examples, instructions 126 may iterate through the list 130, retrieving each portion index object indicated by object name in the list 130, as described above. In other examples, instructions 126 may sort the list 130 of object names returned based on timestamps of remote object storage system 200 for the portion index objects corresponding to the returned object names (e.g., which may be obtained with the list or separately). In such examples, after the sorting, instructions 126 may then iterate through the list 130, retrieving each portion index object indicated by object name in the list 130, as described above.

In the example of FIG. 1, instructions 128 may generate, on deduplication system 100, deduplication metadata including a plurality of virtual container indexes 190 and a sparse index 140, which instructions 128 may store in local storage (or memory) of system 100 (e.g., at least one machine-readable storage medium of system 100). In the example of FIG. 1, instructions 128 may populate the plurality of virtual container indexes 190 with metadata from the retrieved portion index objects (e.g., 242, 244, 246, etc.) retrieved based on the object names in acquired list 130. As described above, each portion index includes metadata representing at least a portion of a deduplicated backup item, wherein each record of each portion index object represents a respective chunk of backup data (i.e., data of a backup item). As described above, each record of each portion index object comprises a virtual container identifier and a chunk signature, each associated with the respective chunk represented by the record.

In some examples, instructions 126 may iterate through each record of each portion index object identified by object name in acquired list 130 when generating virtual container indexes 190 and sparse index 140. In some examples, instructions 126 may iterate through each of the identified portion indexes in a chronological indicated by the timestamps of system 200. For example, instructions 126 may obtain the list 130 such that the object names are sorted in a chronological order of timestamps (e.g., of creation time) of the portion index objects they represent, as described above. In such examples, instructions 128 may iterate through the list obtaining the identifying and processing the portion index objects sequentially in a chronological order (e.g., iterating through the records of an obtained portion index object, before obtaining the next portion index object identified by name in list 130). In some examples, for each obtained portion index object, instructions 128 may iterate through the records in the portion index object sequentially (as they are ordered in the portion index object), progressively building the virtual container indexes 190 and sparse index 140 as the records are accessed.

In such examples, while iterating through the portion index objects in chronological order, and while iterating through the records of each portion index object in the sequential order in which they are provided in the portion index object (i.e., in the same sequential order as the chunks they represent), instructions 128 may access the virtual container identifier and the chunk signature of each record of each of the portion index objects retrieved based on its listing in list 130. In such examples, for each different virtual container identifier accessed in the records, generate a new virtual container index corresponding to the virtual container identifier. Also in such examples, for each different chunk signature accessed in the records, generate a new virtual container index entry based on a record including the chunk signature.

For example, for each accessed record having a virtual container ID not previously accessed in the records, instructions 128 may create a new virtual container index assigned to that virtual container ID. In the example of FIG. 1, for example, if instructions 128 accessing virtual container ID 250 (having a value "211") in record 246-1 is a first time instructions 128 have accessed a virtual container ID of "211" in the process of accessing the records of portion index objects retrieved based on list 130, then instructions 128 may generate the virtual container index 150 such that it is assigned or associated with the virtual container ID of "211".

In such examples, for each accessed record having a chunk signature not previously accessed in the records, instructions 128 may create a new virtual container index entry in the virtual container index associated with the virtual container identifier of the accessed record. The new virtual container index entry may include a reference count, the chunk signature of the accessed record, and an entity identifier included in the accessed record.

In the example of FIG. 1, for example, if instructions 128 accessing a particular chunk signature 254 in record 246-1 is a first time instructions 128 have accessed the particular chunk signature 254 in the process of accessing the records of portion index objects retrieved based on list 130, then instructions 128 may create a new virtual container index entry 150-1 in the virtual container index 150 associated with the virtual container identifier ("211") of the accessed record 246-1. The new virtual container index entry 150-1 may be created such that it includes the chunk signature 254 of the accessed record 246-1, a reference count 255 (which is initially set to 1), the entity identifier 251 included in the accessed record 246-1, and any other metadata of accessed record 246-1 (e.g., chunk offset 252, chunk size 253, etc,).

In the example of FIG. 1, for each accessed record having a chunk signature that was previously accessed in the records, instructions 128 may increase a reference count in the virtual container index entry associated with the previously accessed chunk signature. In the example of FIG. 1, for example, if instructions 128 accessing record 246-1 have previously accessed chunk signature 254 in another record, then instructions 128 may increase the reference count 255 in virtual container index entry 150-1 associated with the previously accessed chunk signature 254.

As noted above, instructions 128 may generate a sparse index 140 and may populate the sparse index 140 based on a chronological traversal of records in the retrieved portion index objects listed in list 130. In such examples, while iterating through the portion index objects in chronological order, and while iterating through the records of each portion index object in the sequential order in which they are provided in the portion index object, for each of a plurality of the accessed records, instructions 128 may selectively add a mapping of a chunk signature of the accessed record to the virtual container identifier of the accessed record to the sparse index, based on whether the chunk signature of the accessed record meets a sparse signature condition. In the example of FIG. 1, for example, when accessing record 246-1 of portion index object 246, instructions 128 may determine whether the particular chunk signature 254 in record 246-1 meets a sparse signature condition for sparse index 140 (as describe above). If instructions 128 determine that chunk signature 254 does meet the sparse signature condition, then instructions 128 may add, to sparse index 140, a mapping 140-2 of the chunk signature 254 to the virtual container identifier 250 (e.g., having identifier value "211") of the accessed record 246-1. If instructions 128 determine that chunk signature 254 does not meet the sparse signature condition, then instructions 128 may omit adding any entry to sparse index 140 based on the accessed record 246-1 or its chunk signature 254.

In such examples, instructions 128 may generate the virtual container indexes 190 and sparse index 140 based on the retrieved portion index objects (e.g., 242, 244, 246, etc.), without accessing any entity objects stored in the remote object storage system and without any metadata related to chunks of the deduplicated backup items being stored on the deduplication system prior to the acquisition of the list of object names. In such examples, instructions 122, 124, 126, and 128 may reconstruct the virtual container indexes 190 and the sparse index 140 based on metadata stored in remote object storage system 200 (e.g., a cloud object storage system 200), after a loss of that information or when taking over for another failed deduplication system, for example, and without reprocessing the chunks of the backup items.

In some examples, other data that may be lost with indexes 135, 140, and 190 due to a failure as described above may include housekeeping data that indicates entity objects that are slated to be deleted from remote object storage system 200. When a failure occurs before entity objects are able to be deleted, the queue of deletion operations to be performed may be lost. In examples described herein, these deletion operations may still be completed without recovering the housekeeping data. For example, after the generation of the plurality of virtual container indexes 190 (e.g., based on accessing of the virtual container identifiers and the chunk signatures of each record of the retrieved portion index objects, as described above), instructions 122 may acquire, from remote object storage system 200, a list of object names for a plurality of entity objects stored in remote object storage system 200. In some examples, these object names for entity objects may referred to as "entity object names" and may be obtained from system 200 based on a request similar to the request described above in relation to retrieving list 130.

For example, according to the above-described structure for object names for entity objects, all entity objects named by instructions 129 (or corresponding instructions of another system) may share a substring of their object names (i.e., an object name substring). For example, the object names of the entity objects may share the leading tag "C" that precedes the virtual container ID in each object name for an entity object in the example of FIG. 1. In such examples, instructions 122 may create and provide to system 200 a request for remote object storage system 200 to provide a list of object names beginning with the substring indicated in the request (e.g., "C"), for objects stored in remote object storage system 200. Instructions 122 may receive in response a list of object names 130 for all of the entity objects stored in remote object storage system 200, as each object name for each entity object may begin with "C" regardless of the virtual container ID or entity ID. In some examples, the request may be in the form of a list command, filter command, or other suitable command.

In such examples, each of the acquired entity object names includes an entity ID associated with data stored in the entity object and a virtual container ID associated with the entity object. For example, in the example of FIG. 1, the retrieved entity object names may include "C211E00", "C211E01", "C211E02", and "C211E03", where "211" is a virtual container ID for a virtual container 220 associated with each of the entity objects having the listed entity object names, and where "00", "01", "02", and "03" are the respective entity IDs for each of the listed entity object names. In the example of FIG. 1, for each of the acquired entity object names, instructions 128 may determine whether the entity ID of the entity object name is included in an entry of a corresponding virtual container index generated by the deduplication system and identified by the virtual container ID of the entity object name. In such examples, for each of the acquired entity object names for which it is determined that the entity identifier is not included in an entry of the corresponding virtual container index, instructions 128 may cause the entity object having the entity object name to be deleted from the remote object storage system 200 (e.g., by commanding system 200 to delete the entity object).

For example, instructions 128 may determine that the entity ID "00" of the entity object name "C211E00" is included in an entry of virtual container index 150 identified by the virtual container ID "211", and as such instructions 128 may not cause system 200 to delete the corresponding entity object. In some examples, instructions 128 may determine that the entity ID "01" of the entity object name "C211E01" is not included in any entry of virtual container index 150 identified by the virtual container ID "211", and as such instructions 128 may cause system 200 to delete the entity object having name "C211E01". In this manner, examples described herein may delete entity objects not referenced by the reconstructed virtual container indexes 190, as they may represent entity objects that were to be deleted. In some examples, other housekeeping data that may be lost due to a failure may include housekeeping data indicating reference count(s) that are to be decremented in virtual container indexes. In examples described herein, by rebuilding the virtual container indexes (including their reference counts) from the portion index objects stored in remote object storage system 200, as described above, any lost decrementing jobs will be inherently accounted for, as the reference counts are build up again from the portion index objects, as described above.

In the example of FIG. 1, after the generation of the plurality of virtual container indexes 190 based on accessing of the virtual container IDs and the chunk signatures of each record of the retrieved portion index objects, instructions 128 may delete the retrieved portion index objects from the deduplication system. In such examples, instructions 129 of deduplication system 100 may subsequently perform deduplication of a new stream of data using the generated virtual container indexes 190 and sparse index 140, as described above, to continue deduplication within a deduplication domain associated with the virtual container indexes 190 and the sparse index 140. As noted above, in some examples, the remote object storage system 200 may comprise a cloud object storage system 200.

In accordance with the examples described above, examples described herein may enable disaster recovery for deduplication metadata, such as a sparse index and virtual container indexes, from metadata stored on a remote object storage system (such as a cloud object storage system) after loss of the deduplication metadata maintained by a deduplication system. In examples described herein, deduplication system 100 may be hosted on any suitable computer system (e.g., comprising at least one computing device) that is remote from the remote object storage system 200 (e.g., cloud object storage system 200).

As used herein, a "computing device" may be a server, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, the at least one processing resource 110 may fetch, decode, and execute instructions stored on storage medium 120 to perform the functionalities described above in relation to instructions stored on storage medium 120. In other examples, the functionalities of any of the instructions of storage medium 120 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions of medium 120 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, host computing device 100 may include the at least one machine-readable storage medium storing the instructions and the at least one processing resource to execute the instructions.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions of medium 120 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions of medium 120 may be part of an application, applications, or component(s) already installed on deduplication system 100 including processing resource 110. In such examples, the storage medium 120 may include memory such as a hard drive, solid state drive, non-volatile memory device, or the like. In some examples, functionalities described herein in relation to FIG. 1 may be provided in combination with functionalities described herein in relation to any of FIGS. 2-5.

As described above, FIG. 2 is a block diagram of example deduplication system 101 to acquire a list of object names for a plurality of portion index objects. In the example of FIG. 2, deduplication system 101 may include a processing resource 110, as described above in relation to FIG. 1, and a machine-readable storage medium 120 comprising (e.g., storing) at least instructions 122, 124, 126, and 128. Instructions 122, 124, 126, and 128, when executed by processing resource 110, may perform the functionalities described above in relation to instructions 122, 124, 126, and 128 for deduplication system 100 of FIG. 1.

For example, instructions 122 may acquire 180, from a remote object storage system, a list of object names for a plurality of portion index objects, stored in the remote object storage system, wherein, for each of the portion index objects, the acquired object name includes an identifier of an associated deduplicated backup item and information identifying a data range of the associated deduplicated backup item that is represented by metadata of the portion index object, as described above.

Instructions 124 may generate, on deduplication system 101, an index of deduplicated backup items including a respective entry for each different deduplicated backup item identifier in the acquired list of object names, as described above. Instructions 126 may retrieve 182 the plurality of portion index objects from the remote object storage system using the acquired object names, as described above, and instructions 128 may generate, on deduplication system 101, deduplication metadata including a plurality of virtual container indexes and a sparse index, as described above in relation to FIG. 1.

In examples described herein, the at least one processing resource 110 may fetch, decode, and execute instructions stored on storage medium 120 to perform the functionalities described above in relation to instructions stored on storage medium 120. In other examples, the functionalities of any of the instructions of storage medium 120 may be implemented in the form of electronic circuitry, in the form of executable instructions encoded on a machine-readable storage medium, or a combination thereof. In some examples, the functionalities described above in relation to instructions of medium 120 may be implemented by one or more engines which may be any combination of hardware and programming to implement the functionalities of the engine(s), as described herein. In some examples, functionalities described herein in relation to FIG. 2 may be provided in combination with functionalities described herein in relation to any of FIGS. 1 and 3-5.

Figure 3:
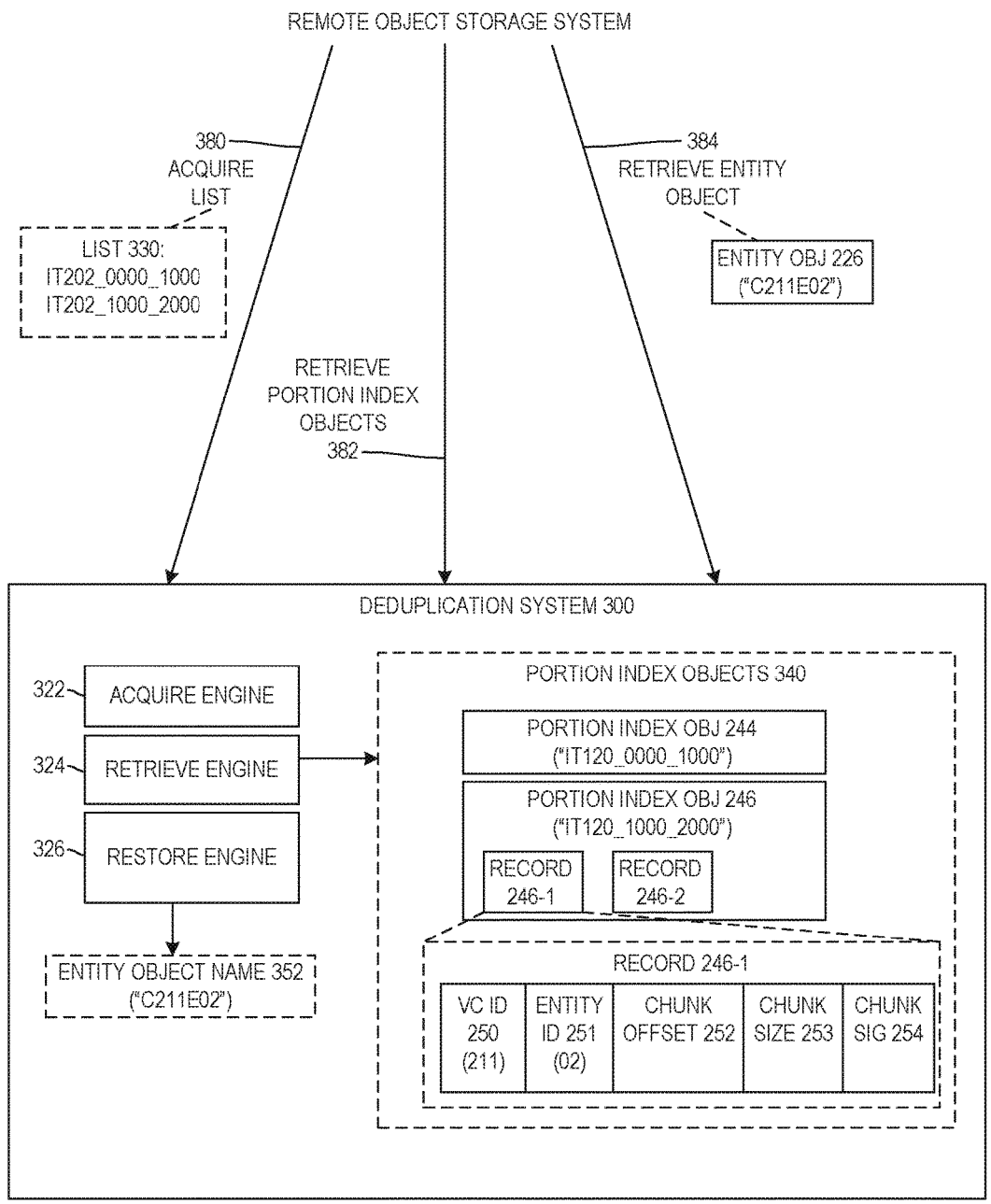
FIG. 3 is a block diagram of an example deduplication system to access metadata of records of retrieved portion index objects.

FIG. 3 is a block diagram of an example deduplication system 300 to access metadata of records of retrieved portion index objects. In the example of FIG. 3, deduplication system 300 may include at least engines 322, 324, and 326, which may be any combination of hardware and programming to implement the functionalities of the engines, as described herein. In some examples, deduplication system 300 may be implemented on or hosted by any suitable computing system comprising at least one computing device. In examples described herein, deduplication system 300 may interact with a remote object storage system that is remote from deduplication system 300, as described above in relation to FIG. 1. In the example of FIG. 3, the remote object storage system may be a remote object storage system such as the remote object storage system 200 described in relation to FIG. 1 (e.g., such as a cloud object storage system).

Examples of performing a restore operation for a specified backup item are described below in relation to FIG. 3. In examples described herein, deduplication system 300 may perform a restoration of a backup item from a remote object storage system based on the data stored in the remote object storage system and without reliance on metadata related to chunks of the deduplicated backup item being stored on the deduplication system prior to beginning the restore process. Such examples of a deduplication system 300 that does not rely on previously stored local metadata related to a backup item for a restore process, as described herein in relation to FIG. 3, may efficiently restore a backup item from a remote object storage system after a loss of local data at the deduplication system 300. Such an example deduplication system 300 may also efficiently restore a backup item, deduplicated and stored to the remote object storage system by another backup system, based on the data and metadata stored in the remote object storage system. In such examples, deduplication system 300 may efficiently restore the backup item from the remote object storage system, based on data and metadata stored in the remote object storage system, after a failure of the other backup system, for example. For clarity of explanation, functionalities of deduplication system 300 may be described in relation to the example objects stored in remote object storage system 200 in the example illustrated in FIG. 1.

As noted above, in some examples, deduplication system 300 may perform a restore operation from a remote object storage system. In the example of FIG. 3, acquire engine 322 of deduplication system 300 may acquire 380 (e.g., retrieve, receive, etc.), from a remote object storage system, a list 330 of object names for a plurality of portion index objects, stored in the remote object storage system, that share an object name substring identifying a given deduplicated backup item to be restored from the remote object storage system. In some examples, acquire engine 322 may receive a request to restore a specified backup item from the remote object storage system, where the request may be received from a client application executing local to or remote from deduplication system 300. Based on the backup item specified by the client application in the request, acquire engine 322 may utilize an identifier for the specified backup item to obtain the object names for the portion index objects representing the backup item. For example, in examples having the above-described structure for object names for portion index objects, portion index objects representing portions of a given backup item may share a substring of their object names (i.e., an object name substring) identifying the backup item. For example, the object names of the portion index objects representing portions of a backup item having a backup item ID of "202" may share a substring "IT202" at the beginning of their object names, as illustrated in the example of FIG. 1. In such examples, acquire engine 322 may utilize the shared object name substring to obtain the list 330 of object names of portion index objects.

In such examples, after receiving the request, acquire engine 322 may create a request for the remote object storage system to provide a list of object names beginning with a specified substring, for objects stored in the remote object storage system. In such examples, acquire engine 322 may provide the created request to the remote object storage system to acquire 380 the list 330 of object names beginning with the specified substring. For example, in the example of FIG. 3, the client application may request a restore of a particular backup item. In some examples, the backup item ID for the backup item may be provided by the client in the request, or the backup item ID may be determined by deduplication system 330 from the remote object storage system based on the request from the client, as described below (e.g., when the client uses a client-specific identifier for the backup item). In the example of FIG. 3, the backup item ID for the particular backup item may be "202". In such examples, after receiving the request from the client, acquire engine 322 may create a request for the remote object storage system to provide a list of object names beginning with a substring "IT202" (for objects stored in the remote object storage system). In such examples, acquire engine 322 may provide the created request to the remote object storage system to acquire 380 the list 330 of object names beginning with the specified substring "IT202". In some examples, the request may be in the form of a list command, a filter command, or another suitable command.

In the example of FIG. 3, the acquired list 330 may include at least object names "IT202_0000_1000" (for a portion index object 244 shown in FIG. 1) and "IT202_1000_2000" (for a portion index object 246 shown in FIG. 1). In such examples, for each of the portion index objects having a name sharing the indicated substring, the acquired object name may include an identifier of the specified deduplicated backup item and information identifying a data range of the specified deduplicated backup item that is represented by metadata of the portion index object, as described above. For example, a first acquired object name in list 330, "IT202_0000_1000" may include an identifier "202" of an associated deduplicated backup item, and information "0000_1000" identifying a data range of the associated deduplicated backup item that is represented by metadata of the portion index object for which "IT201_0000_1000" is the object name. In other examples, acquire engine 322 may form the substring of the request differently in examples in which object names are formatted differently (e.g., beginning with a different leading tag, such as "I", "ITEM", etc., instead of "IT").

In the example of FIG. 3, retrieve engine 324 may retrieve 382 the plurality of portion index objects 340, having the object names included in the returned list 330, from the remote object storage system using the acquired object names included in list 330. For example, engine 324 may request, from the remote object storage system, the portion index objects having the object names included in list 330 (e.g., at least portion index objects 244 and 246 of FIG. 1). For example, engine 324 may traverse the acquired list 330 to access each object name in the list. Engine 324 may further create one or more requests, specifying the accessed object names, to request that remote object storage system return the portion index objects identified by the object names indicated in the request(s). For example, engine 324 may create a separate request for each accessed object name in the acquired list 330, may create one or more bulk requests specifying multiple of the accessed object names, or a combination thereof. In some examples, separate requests may be provided concurrently. In such examples, engine 324 may provide the request(s) to remote object storage system to request that remote object storage system return the portion index objects identified by the object names indicated in the request(s). In the example of FIG. 3, retrieve engine 324 may retrieve 382 at least portion index objects 244 and 246, from the remote object storage system, using at least the acquired object names "IT202_0000_1000" and "IT202_1000_2000" included in list 330, as described above.

In the example of FIG. 3, for each of the retrieved portion index objects 340, restore engine 326 may access metadata of each of a plurality of records in the portion index object, including a virtual container ID and an entity ID of each record. In examples described herein, each record of a portion index object may represent a chunk of a backup item and include metadata associated with the chunk of the backup item (where the backup item is at least partially represented by the portion index object).

In some examples, restore engine 326 may select each of the retrieved portion index objects 340 one at a time, for accessing the records of the portion index objects. In some examples, restore engine 326 is to sequentially select retrieved portion index objects in an order according to the data ranges indicated in the respective object names associated with the portion index objects, and access the metadata in the records of the selected portion index object before selecting the next portion index object according to the order. For example, in the example of FIG. 3, engine 326 may select portion index object 244 before selecting portion index object 246, because the object name for object 244 ("IT202_0000_1000") indicates a data range ("0000_1000") that is in order before the data range ("1000_2000") indicated by the object name of object 246 ("IT202_1000_2000"). After selecting portion index object (according to the order of data ranges indicated), engine 326 may access metadata in all the records of portion index object 244 (including a virtual container ID and an entity ID in each record). After accessing metadata in each of the records of portion index object 244, engine 326 may then select portion index object 246 (according to the data ranges) and access metadata in each of the records of portion index object 246 (including a virtual container ID and an entity ID in each record).

In such examples, for each of the retrieved portion index objects (sequentially in an order specified by the indicated data ranges), restore engine 326 may access metadata of each of a plurality of records in the portion index object, including a virtual container ID and an entity ID, as described above. Engine 326 may access each of the records in a given portion index object in the sequential order in which they appear in the given portion index object (which is the same as the order of the chunks that the records represent, as described above). When restore engine 326 is accessing metadata of the records, for each different combination of virtual container ID and entity ID identified in one of the accessed records, engine 326 may construct an entity object name including the virtual container ID and the entity ID. In such examples, engine 326 may retrieve 384 an entity object, having the constructed entity object name, from the remote object storage system.

For example, in the example of FIG. 3, when restore engine 326 is accessing metadata of the records of portion index object 246, restore engine 326 may access metadata of record 246-1, including the virtual container ID 250 having a value of "211" and the entity ID 251 having a value of "02". In some examples, restore engine 326 may identify the combination of a virtual container ID of "211" and an entity ID of "02" in a record has not been encountered previously in accessing the records of portion index objects 340. In response to the identification, engine 326 may construct an entity object name 352 including the virtual container ID of "211" and the entity ID of "02", such as an object name "0211E02" (in accordance with the above-described structure for entity object names). In such examples, engine 326 may retrieve 384 the entity object 226, having the constructed entity object name 352, from the remote object storage system (e.g., by requesting the object using the constructed name, as described above).

In such a manner, in the example of FIG. 3, restore engine 326 may traverse the records of each portion index object and, at the first encounter of a particular combination of virtual container ID value and entity ID value in a record, engine 326 may construct an appropriate object name including the virtual container ID value and entity ID value, and retrieve the corresponding entity object having (or associated with) the constructed object name. In this manner, in examples described herein, restore engine 326 may retrieve each of the entity objects stored in remote object storage system including a chunk represented by a record of a retrieved portion index object for the specified backup item. In such examples, engine 326 may, for each entity object having chunks to be restored, retrieve the entity object once. In such examples, the retrieved entity object may be stored in local storage of deduplication system 300 such that engine 326 may then restore chunks from the locally stored copy of the retrieved entity object.

In such examples, for each of the accessed records of each of the retrieved portion index objects, engine 326 may store a corresponding chunk of data included in a retrieved entity object in a buffer for output. For example, as noted above, each record of the portion index objects may represent a chunk of the specified backup item. In such examples, for each of a plurality of records accessed in the retrieved portion index objects, engine 326 may access a chunk indicated by that record by accessing a stored entity object having an object name including the virtual container ID and the entity ID of the record, and accessing the chunk located within that entity object at the chunk offset specified in the record. Engine 326 may then store the accessed chunk in a buffer in memory of deduplication system 330 for output. In examples in which chunk(s) are stored in a compressed form, they may be decompressed prior to being buffered. Engine 326 may periodically output the data in the buffer. For example, engine 326 may output the data in the buffer when the amount of data in the buffer reaches a certain size, or the like, and may output the data in the buffer to the requesting client application, for example. In some examples, the client application may request restore of an entire backup item. In such examples, engine 326 may access, buffer, and output each of the chunks represented by each of the records of the retrieved portion index objects 340. In other examples, a client application may request a specified portion of the backup item. In such examples, engine 326 may access, buffer, and output the chunks represented by the records of the retrieved portion index objects 340 that represent the indicated range.

As described above, deduplication system 300 may include at least engines 322, 324, and 326, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine of deduplication system 300. In some examples, the at least one machine-readable storage medium may store instructions that, when executed by the at least one processing resource, at least partially implement some or all engines of deduplication system 300. In such examples, deduplication system 300 may include the at least one machine-readable storage medium storing the instructions and the at least one processing resource to execute the instructions. In other examples, the functionalities of any engines of deduplication system 300 may be at least partially implemented in the form of electronic circuitry. In some examples, functionalities described herein in relation to FIG. 3 may be provided in combination with functionalities described herein in relation to any of FIGS. 1, 2, 4, and 5.

Figure 4:
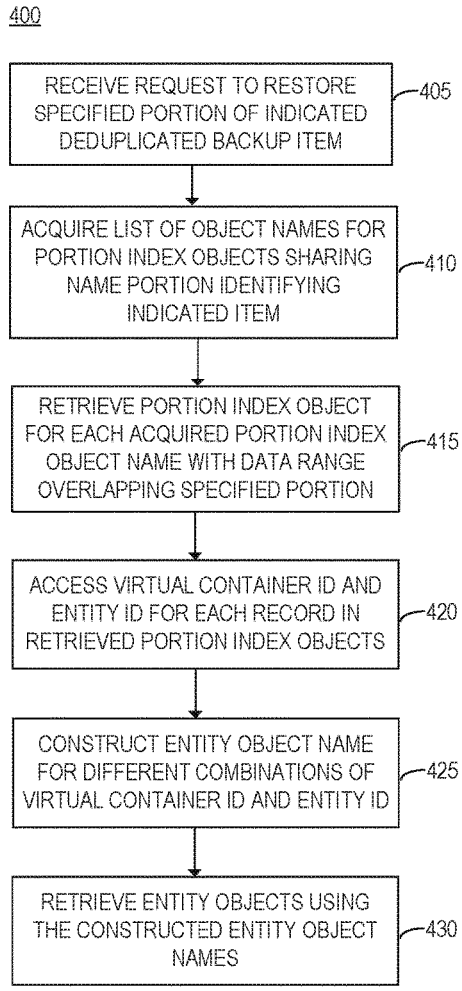
FIG. 4 is a flowchart of an example method of a deduplication system including constructing entity object names from identifiers accessed in portion index objects.

FIG. 4 is a flowchart of an example method 400 of a deduplication system including constructing entity object names from identifiers accessed in portion index objects. Although execution of method 400 is described below with reference to deduplication system 300 of FIG. 3, other suitable systems for the execution of method 400 may be utilized (e.g., deduplication system 100 of FIG. 1). Additionally, implementation of method 400 is not limited to such examples.

In the example of FIG. 4, method 400 may be performed by deduplication system 300 remote from a remote object storage system. At 405 of method 400, acquire engine 322 of deduplication system 300 may receive a request to restore a specified portion of an indicated deduplicated backup item, as described above. For example, engine 322 may receive the request from a local or remote client application. At 410, engine 322 of deduplication system 300 may acquire, from the remote object storage system, a list of object names for a plurality of portion index objects, stored in the remote object storage system, that share an object name substring identifying the indicated deduplicated backup item, as described above. In such examples, for each of the portion index objects, the acquired object name includes an identifier of the given deduplicated backup item and information identifying a data range of the associated deduplicated backup item that is represented by metadata of the portion index object.

At 415, for each acquired object name indicating a data range overlapping with the specified portion of the indicated deduplicated backup item, retrieve engine 324 of deduplication system 300 may retrieve the portion index object having the acquired object name from the remote object storage system. For example, engine 324 may traverse the acquired list of object names to access each object name in the list, and for each object name having a range that is overlapping (e.g., that includes at least a portion of the specified portion of the backup item), engine 324 may retrieve the entity object using the object name, as described above.

At 420, for each of the retrieved portion index objects, engine 326 may access a virtual container ID and an entity ID in each of a plurality of records in the retrieved portion index object. In such examples, for each different combination of virtual container ID and entity ID identified in one of the accessed records (as described above), engine 326 may construct an entity object name including the virtual container ID and the entity ID at 425, and may retrieve an entity object from the remote object storage system using the constructed entity object name at 430, as described above. In the example of FIG. 4, engine 326 may access records for each of the portion index object, where the engine 326 accesses the retrieved portion index objects sequentially in the order of the data ranges indicated in the respective object names for the portion index object, as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
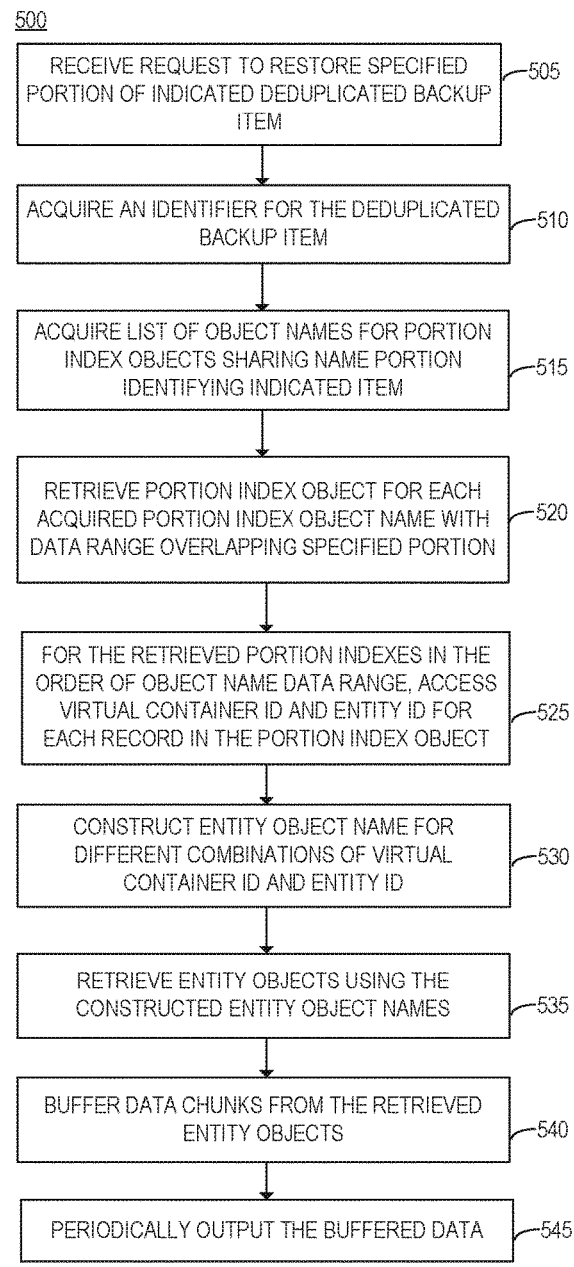
FIG. 5 is a flowchart of an example method of a deduplication system including outputting data from retrieved entity objects.

FIG. 5 is a flowchart of an example method 500 of a deduplication system including outputting data from retrieved entity objects. Although execution of method 500 is described below with reference to deduplication system 300 of FIG. 3, other suitable systems for the execution of method 500 may be utilized (e.g., deduplication system 100 of FIG. 1). Additionally, implementation of method 500 is not limited to such examples.

In the example of FIG. 5, method 500 may be performed by deduplication system 300 remote from a remote object storage system. At 505 of method 500, acquire engine 322 of deduplication system 300 may receive a request to restore a specified portion of an indicated deduplicated backup item, as described above. For example, engine 322 may receive the request from a local or remote client application. In some examples, request from the client application may include a first ID for the indicated deduplicated backup item (e.g., a client-specific ID). In such examples, at 510 engine 322 may acquire, from the remote object storage system, a second ID for the indicated deduplicated backup item (e.g., utilized in the remote object storage system), wherein the shared object name substring is based on the second ID for the indicated deduplicated backup item. In such examples, engine 322 may receive the first ID for the backup item and request information from remote object storage system mapping the first ID to the second ID to obtain the second ID.

At 515, engine 322 of deduplication system 300 may acquire, from the remote object storage system, a list of object names for a plurality of portion index objects, stored in the remote object storage system, that share an object name substring identifying the indicated deduplicated backup item, as described above. In such examples, for each of the portion index objects, the acquired object name includes an identifier of the given deduplicated backup item (e.g., the second ID) and information identifying a data range of the associated deduplicated backup item that is represented by metadata of the portion index object. At 520, for each acquired object name indicating a data range overlapping with the specified portion of the indicated deduplicated backup item, retrieve engine 324 of deduplication system 300 may retrieve the portion index object having the acquired object name from the remote object storage system. For example, engine 324 may traverse the acquired list of object names to access each object name in the list, and for each object name having a range that is overlapping (e.g., that includes at least a portion of the specified portion of the backup item), engine 324 may retrieve the entity object using the object name, as described above.

At 525, for each of the retrieved portion index objects, engine 326 may access a virtual container ID and an entity ID in each of a plurality of records in the retrieved portion index object. In some examples, engine 326 performs the accessing of IDs in the retrieved portion index objects sequentially for the retrieved portion index objects (i.e., one after the other for the portion index object) and in an order defined by the data ranges indicated in the respective object names associated with the portion index objects (e.g., proceeding sequentially from earliest data range to latest data range). For each different combination of virtual container ID and entity ID identified in one of the accessed records (as described above), engine 326 may construct an entity object name including the virtual container ID and the entity ID at 530, and may retrieve an entity object from the remote object storage system using the constructed entity object name at 535, as described above. In the example of FIG. 5, for each of the accessed records of each of the retrieved portion index objects, engine 326 may buffer (i.e., store in a buffer of deduplication system 300) a chunk of data included in a retrieved entity object that identified by the virtual container ID and the entity ID of the record, and that is located within the retrieved entity object at a chunk offset specified in the record, as described above. Engine 326 may decompress any compressed chunks prior to buffering them. At 545, engine 326 may periodically output the data in the buffer (e.g., to the client application). As described above, engine 326 may output the data in the buffer when a sufficient amount of data has been buffered, for example.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource of a deduplication system to:
   acquire, from a remote object storage system, a list of object names for a plurality of portion index objects, stored in the remote object storage system, that share an object name substring indicated in a request provided by the deduplication system to the remote object storage system;
   wherein, for each of the plurality of portion index objects, the acquired object name, of the list of object names, includes an identifier of an associated deduplicated backup item and information identifying a data range of the associated deduplicated backup item that is represented by metadata of the portion index object;
   generate, on the deduplication system, an index of deduplicated backup items including a respective entry for each different identifier of the identifiers associated with the deduplicated backup items and included in the acquired list of object names;
   retrieve the plurality of portion index objects from the remote object storage system using the acquired object names of the list of object names; and
   generate, on the deduplication system, deduplication metadata including:
      a plurality of virtual container indexes populated with metadata from the retrieved portion index objects; and
      a sparse index populated based on a chronological traversal of records in the retrieved portion index objects,
      wherein the generation of the virtual container indexes and the sparse index is based on the retrieved portion index objects, without accessing any entity objects stored in the remote object storage system and without any metadata related to chunks of the deduplicated backup items being stored on the deduplication system prior to the acquisition of the list of object names.

2. The article of claim 1, wherein the instructions to retrieve are to retrieve the plurality of portion index objects from the remote object storage system chronologically, using the acquired object names and based on timestamps of the remote object storage system.

3. The article of claim 1, wherein:
   each record of each portion index object represents a respective chunk of backup data, and comprises a virtual container identifier and a chunk signature, each associated with the respective chunk; and
   the instructions to generate the deduplication metadata are to:
      access the virtual container identifier and the chunk signature of each record of each of the retrieved portion index objects;
      for each different virtual container identifier accessed in the records, generate a virtual container index corresponding to the virtual container identifier; and
      for each different chunk signature accessed in the records, generate a virtual container index entry based on a record including the chunk signature.

4. The article of claim 3, wherein, when accessing the virtual container identifier and the chunk signature of each record of each of the retrieved portion indexes, the instructions to generate the deduplication metadata are to:
   for each of a plurality of the accessed records, selectively add a mapping of a chunk signature of the accessed record to the virtual container identifier of the accessed record to the sparse index, based on whether the chunk signature of the accessed record meets a sparse signature condition.

5. The article of claim 3, wherein, when accessing the virtual container identifier and the chunk signature of each record of each of the retrieved portion indexes, the instructions to generate the deduplication metadata are to:
   for each accessed record having a chunk signature not previously accessed in the records, create a virtual container index entry in the virtual container index associated with the virtual container identifier of the accessed record, the virtual container index entry comprising a reference count, the chunk signature, and an entity identifier included in the accessed record; and
   for each accessed record having a chunk signature that was previously accessed in the records, increase a reference count in the virtual container index entry associated with the previously accessed chunk signature.

6. The article of claim 5, wherein the instructions further comprise instructions to, after the generation of the plurality of virtual container indexes based on the accessing of the virtual container identifiers and the chunk signatures of each record of the retrieved portion index objects:
   acquire, from the remote object storage system, a list of entity object names for a plurality of entity objects stored in the remote object storage system;
   wherein each of the acquired entity object names includes an entity identifier associated with an entity object and a virtual container identifier associated with the entity object;
   for each of the acquired entity object names, determine whether the entity identifier of the entity object name is included in an entry of a corresponding virtual container index generated by the deduplication system and identified by the virtual container identifier of the entity object name; and
   for each of the acquired entity object names for which it is determined that the entity identifier is not included in an entry of the corresponding virtual container index, cause the entity object having the entity object name to be deleted from the remote object storage system.

7. The article of claim 3, wherein the instructions comprise instructions to, after the generation of the plurality of virtual container indexes based on the accessing of the virtual container identifiers and the chunk signatures of each record of the retrieved portion index objects:
   delete the retrieved portion index objects from the deduplication system; and
   perform deduplication of a stream of data with the deduplication system using the generated virtual container indexes and sparse index,
   wherein the remote object storage system comprises a cloud object storage system.

8. A deduplication system comprising:
   an acquire engine including hardware, the acquire engine to acquire, from a remote object storage system, a list of object names for a plurality of portion index objects, stored in the remote object storage system, that share an object name substring indicated in a request provided by the deduplication system to the remote object storage system and identifying a given deduplicated backup item to be restored from the remote object storage system;

wherein, for each of the plurality of portion index objects, the acquired object name, of the list of object names, includes an identifier of the given deduplicated backup item and information identifying a data range of the associated deduplicated backup item that is represented by metadata of the portion index object;

a retrieve engine to retrieve the plurality of portion index objects from the remote object storage system using the acquired object names of the list of object names; and a restore engine to select each of the retrieved portion index objects in order according to the data ranges indicated in the respective object names associated with the portion index objects for the accessing of metadata in records of the portion index objects, and for each selected retrieved portion index object;

access metadata of each of a plurality of records in the portion index object, including a virtual container identifier and an entity identifier; and for each different combination of virtual container identifier and entity identifier identified in one of the accessed records, construct an entity object name including the virtual container identifier and the entity identifier and retrieve an entity object, having the constructed entity object name, from the remote object storage system.

9. The deduplication system of claim 8, wherein the restore engine is further to:

for each of the accessed records of each of the retrieved portion index objects:

store in a buffer a chunk of data included in a retrieved entity object that is identified by virtual container identifier and entity identifier of the accessed record of the plurality of records of the retrieved portion index object, and that is located within the retrieved entity object at a chunk offset specified in the record; and periodically output the data in the buffer.

10. A method of a deduplication system remote from a remote object storage system, the method comprising:

receiving a request to restore a specified portion of an indicated deduplicated backup item;

with the deduplication system, acquiring, from the remote object storage system, a list of object names for a plurality of portion index objects, stored in the remote object storage system, that share an object name substring indicated in the request provided by the deduplication system to the remote object storage system;

wherein, for each of the plurality of portion index objects, the acquired object name, of the list of object names, includes an identifier of the identified deduplicated backup item and information identifying a data range of the identified deduplicated backup item that is represented by metadata of the portion index object;

for each acquired object name, of the list of object names, that indicates a data range overlapping with the specified portion of the indicated deduplicated backup item, retrieving the portion index object, of the plurality of portion index objects, having the acquired object name from the remote object storage system;

for each of the retrieved portion index objects, of the plurality of portion index objects, accessing a virtual container identifier and an entity identifier in each of a plurality of records in the retrieved portion index object, wherein the accessing identifiers in the retrieved portion index objects is performed sequentially for the retrieved portion index objects and in an order defined by the data ranges indicated in the respective object names associated with the portion index objects; and for each different combination of virtual container identifier and entity identifier identified in one of the accessed records:

constructing an entity object name including the virtual container identifier and the entity identifier; and retrieving an entity object from the remote object storage system using the constructed entity object name.

11. The method of claim 10, further comprising:

for each of the accessed records of each of the retrieved portion index objects:

storing in a buffer a chunk of data included in a retrieved entity object that is identified by the virtual container identifier and the entity identifier of the accessed record of the plurality of records of the retrieved portion index object, and that is located within the retrieved entity object at a chunk offset specified in the record; and periodically output the data in the buffer.

* * * * *